United States Patent
Jones

(10) Patent No.: US 10,557,497 B1
(45) Date of Patent: Feb. 11, 2020

(54) AXIAL THRUST FOIL AIR BEARING WITH THRUST SENSOR

(71) Applicant: Florida Turbine Technologies, Inc., Jupiter, FL (US)

(72) Inventor: Russell B Jones, North Palm Beach, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 0 days.

(21) Appl. No.: 16/446,948

(22) Filed: Jun. 20, 2019

Related U.S. Application Data

(60) Provisional application No. 62/688,946, filed on Jun. 22, 2018.

(51) Int. Cl.
*F16C 17/04* (2006.01)
*F16C 41/00* (2006.01)

(52) U.S. Cl.
CPC ............ *F16C 17/042* (2013.01); *F16C 41/00* (2013.01); *F16C 2233/00* (2013.01); *F16C 2360/23* (2013.01)

(58) Field of Classification Search
CPC .. F16C 17/024; F16C 17/042; F16C 2233/00; F16C 41/00; F16C 2360/23
See application file for complete search history.

(56) References Cited

U.S. PATENT DOCUMENTS

| | | | | |
|---|---|---|---|---|
| 5,772,334 A | * | 6/1998 | Parkins | F16C 17/035 384/117 |
| 2004/0096130 A1 | * | 5/2004 | Saville | F16C 17/042 384/106 |
| 2005/0271311 A1 | * | 12/2005 | Saville | F16C 17/042 384/106 |
| 2006/0062500 A1 | * | 3/2006 | Struziak | F16C 17/042 384/106 |
| 2009/0324148 A1 | * | 12/2009 | Ruggiero | F16C 17/024 384/103 |
| 2012/0020595 A1 | * | 1/2012 | Kim | F16C 17/035 384/105 |
| 2015/0362012 A1 | * | 12/2015 | Ermilov | F16C 17/024 384/105 |
| 2015/0369294 A1 | * | 12/2015 | Rocchi | F16C 37/002 384/105 |
| 2016/0091016 A1 | * | 3/2016 | Struziak | F16C 43/02 384/105 |
| 2018/0156265 A1 | * | 6/2018 | Luo | F16C 17/02 |
| 2018/0195551 A1 | * | 7/2018 | Poteet | F16C 17/102 |

* cited by examiner

*Primary Examiner* — Alan B Waits
(74) *Attorney, Agent, or Firm* — Koenig IP Works, PLLC

(57) ABSTRACT

An axial thrust load sensor for an axial thrust foil bearing used in a small gas turbine engine, the axial thrust load sensor having a axial thrust foil bearing plate and an intermediate washer plate and a load sensor plate arranged face to face to form the load sensor. The load sensor plate has three pedestals on a front side and three pedestals on a back side so that all six pedestals alternate at equal spacing. Next to each pedestal is a strain gauge connected to a controller. The controller regulates a supply of cooling air to the axial thrust bearing in order to control a thrust balance.

6 Claims, 5 Drawing Sheets

AXIAL THRUST FOIL AIR BEARING WITH THRUST SENSOR

CROSS-REFERENCE TO RELATED APPLICATIONS

This application claims the benefit to U.S. Provisional Application 62/688,946 filed on Jun. 22, 2018 and entitled Axial Thrust Foil Air Bearing with Thrust Sensor.

GOVERNMENT LICENSE RIGHTS

None.

BACKGROUND OF THE INVENTION

Field of the Invention

The present invention relates generally to a small gas turbine engine for a UAV, and more specifically for small gas turbine engine with foil air bearings to support the rotor.

Description of the Related Art Including Information Disclosed Under 37 CFR 1.97 and 1.98

In a gas turbine engine, a compressor is rotatably connected to the gas turbine through a shaft which is supported by bearings. In larger engines such as those used for commercial aircraft, the rotor is supported by roller bearings that are cooled using a lubricant. With this system, a lubricant reservoir is required as well as the lubricant pump and the lubricant pipes to pass the lubricant from the reservoir to the bearings and back into the reservoir. This lubrication system can make up a significant percentage of the engines weight. For a power plant used for a UAV (Unmanned Aero Vehicle), where space and volume and weight are critical elements, a lubrication system for the bearings is not used. Dry bearings such as foil air bearings are required. However, small gas turbine engines operate at very high speeds at over 70,000 rpm where roller bearings cannot be used. Foil air bearings have significant issues at these speeds.

BRIEF SUMMARY OF THE INVENTION

A small gas turbine engine to power a UAV in which the rotor is supported by radial and axial foil air bearings, and where the axial thrust foil air bearing includes an axial thrust load sensor with strain gages connected by wires to a circuit for strain gage measurement. The signal representing the thrust load is used in a thrust management system for active thrust management control in flight. Compressor bleed air is used to cool a bearing. Using a direct thrust management sensor within the engine will make it possible to modulate the cooling air flow pressure to the bearing to accommodate thrust balance.

DETAILED DESCRIPTION OF THE INVENTION

The present invention is a small gas turbine engine for a UAV in which the rotor is supported by foil air bearings, and where an axial thrust load sensor is built in to an axial thrust foil air bearing to detect an amount of axial thrust on the axial thrust foil air bearing and regulate a cooling air flow to accommodate thrust balance.

Figure 1:
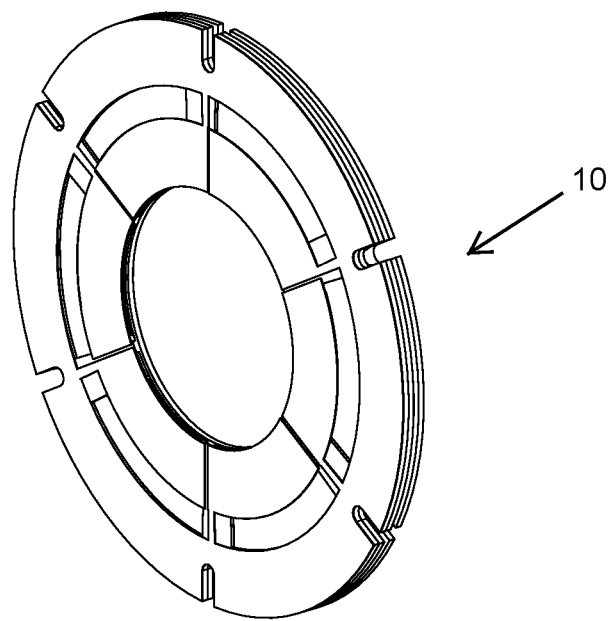
FIG. 1 shows an axial thrust foil air bearing with thrust sensor in an assembled view of the present invention.
Figure 2:
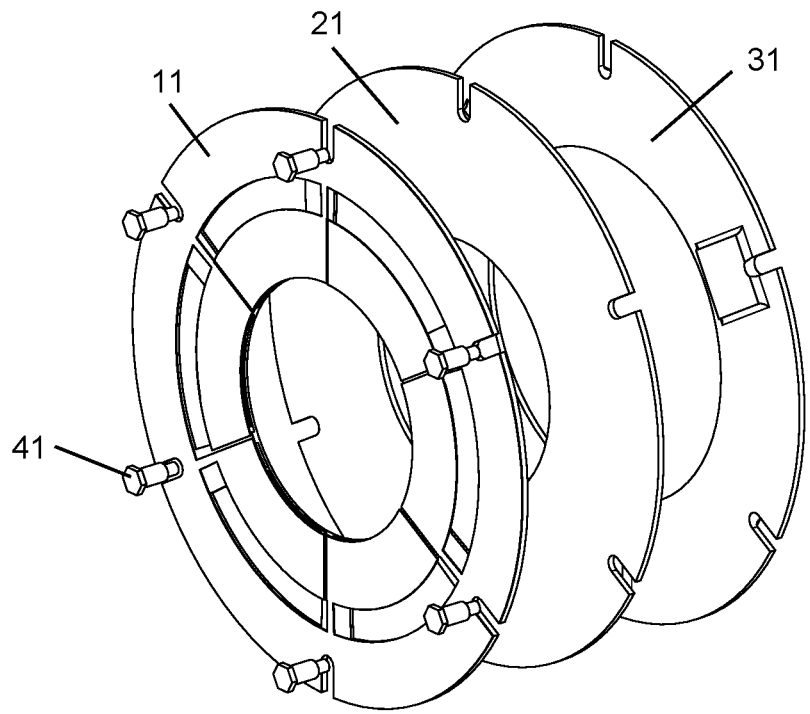
FIG. 2 shows an axial thrust foil air bearing with thrust sensor in an exploded view of the present invention.

FIG. 1 shows an axial thrust foil air bearing used in the axial thrust load sensor in an assembled view of the present invention. FIG. 2 shows an exploded view of the axial thrust load sensor of FIG. 1 with an axial thrust foil bearing plate 11, an intermediate washer plate 21, and a load sensor plate 31. Each plate includes a number of slots that fit in shoulder bolts 42 that secure the plates together in assembly.

Figure 10:
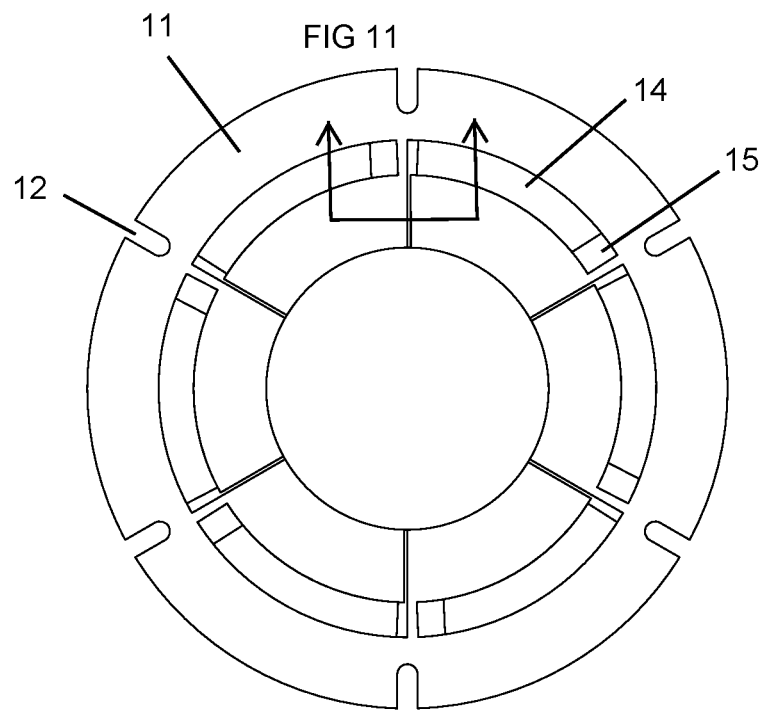
FIG. 10 shows a front view of axial thrust foil bearing plate used in the axial thrust balance sensor of the present invention.
Figure 11:
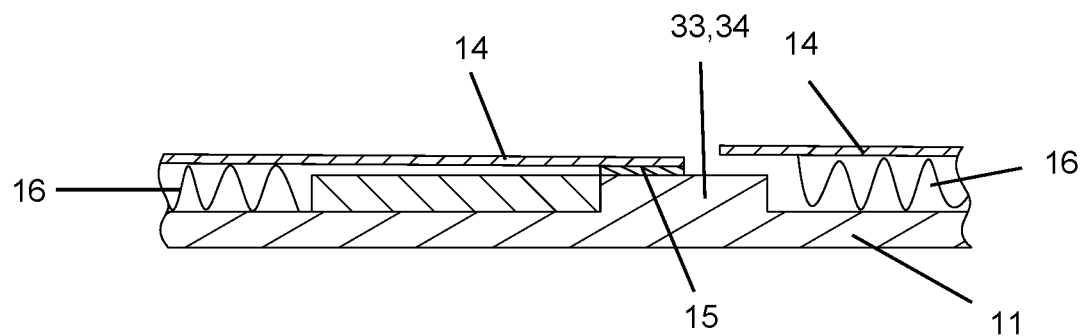
FIG. 11 shows a cross section side view of the axial thrust foil bearing plate of FIG. 10.

FIG. 2 shows an axial thrust foil bearing plate used in the axial thrust load sensor 10 of FIG. 1. The axial thrust foil bearing plate 11 includes a series of slots 12 arranged along a perimeter of the plate 11 for assembly. The plate 11 includes a number of foil bearing flexible fingers 14 that form the axial thrust foil bearing. FIG. 10 shows a front view of the axial thrust foil bearing plate 11 and the slots 12. The number of slots used are six but could change. FIG. 11 shows a cross section side view of one of these flexible fingers 14 which is attached to the plate 11 at a base 15 that is brazed to the plate 11. A zig-zag shaped bump foil 16 that is secured between the finger 14 and the plate 11 and provides for the spring force of the axial thrust foil bearing.

Figure 3:
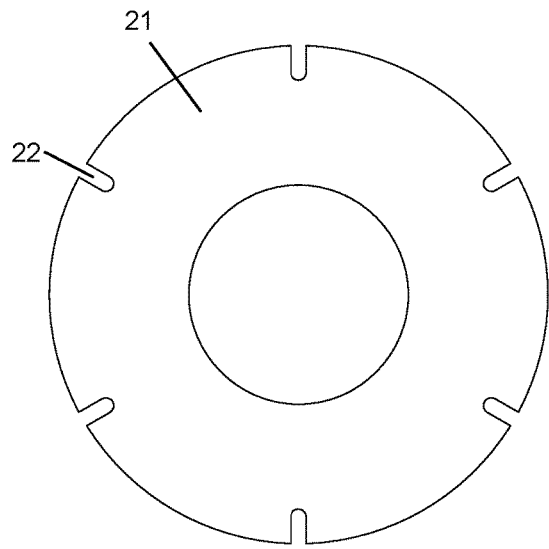
FIG. 3 shows front view of the intermediate washer used in the axial thrust balance sensor of the present invention.

FIG. 3 shows a front view of the intermediate washer 21 used in the axial thrust load sensor 10. This intermediate washer 21 will be positioned between the axial thrust load sensor plate 11 and the load sensor plate 31 of axial thrust load sensor 10. The intermediate washer 15 includes slots 22 aligned with the slots 12 of the plate 11 for assembly, and provides for a planar surface to the foil bearing to react on.

Figure 4:
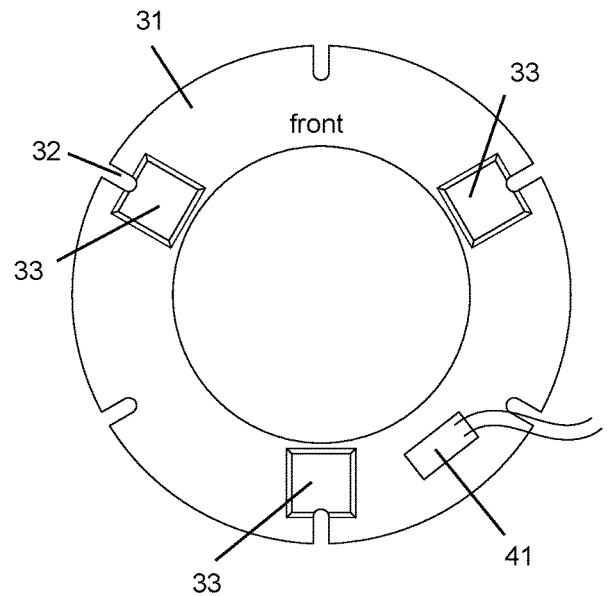
FIG. 4 shows front side and a load sensor plate used in the axial thrust load sensor of the present invention.
Figure 5:
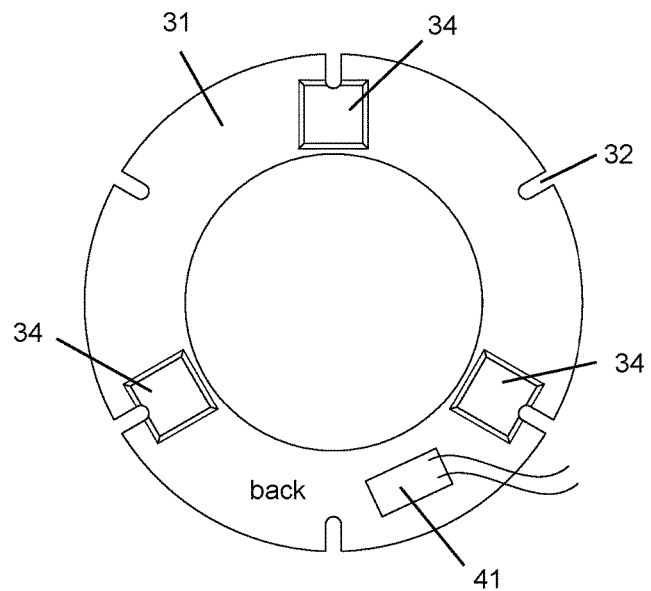
FIG. 5 shows a back side and the load sensor plate of FIG. 6 used in the axial thrust load sensor of the present invention.

FIG. 4 shows a front side of the load sensor plate 31 while FIG. 5 shows a back side of the plate 31. The load sensor plate 31 has three strain gauges 41 on the front side and three strain gauges 41 on the back side that alternate between each other so that each of the six strain gauges 41 are equally spaced in a circumferential direction. The load sensor plate 31 has three flat pedestals 33 on the front side and three flat pedestals 34 on the back side. These six flat pedestals 33 and 34 also alternate in the circumferential direction so that each of the pedestals are equally spaced. Each strain gauge 41 is located adjacent to a pedestal 33 or 34. The flat surface of each pedestal makes contact with the intermediate washer 21 on one side and a surface of the housing on the opposite side.

Figure 9:
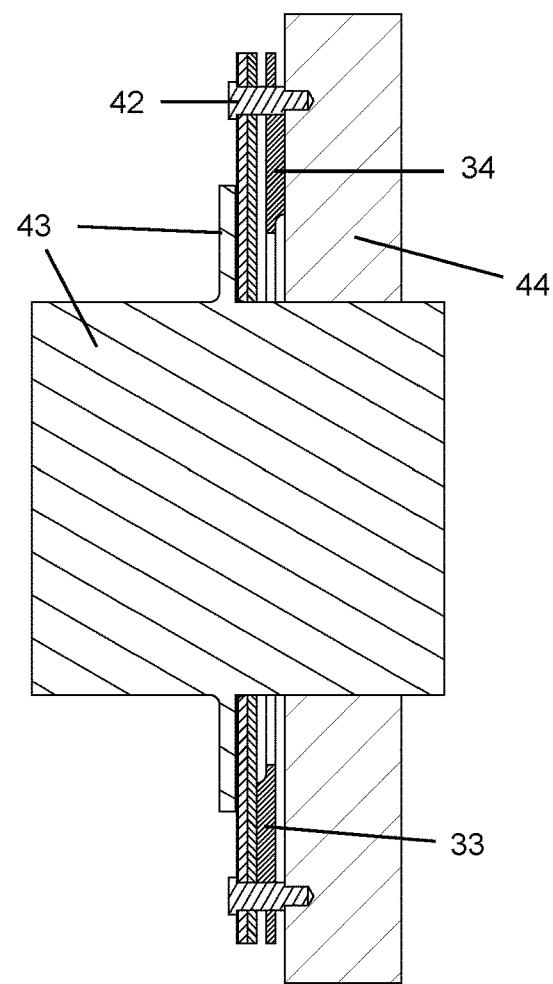
FIG. 9 shows a side view of the axial thrust foil air bearing with thrust sensor on a rotor.

FIG. 9 shows a side view of the axial thrust foil air bearing with thrust sensor in place on a rotor with the pedestals 33 and 34 abutting the surfaces.

The strain gages 41 are bonded to the plate 31. Groups of strain gages 41 are wired in series and connected to a bridge circuit for strain measurement. It is possible to increase a number of pedestals 33 and 34 and tailor the wall thickness of the plate 31 to tailor a deflection and resulting stress. In the FIG. 4 embodiment, three strain gages are used on each of the two sides of the plate. FIG. 2 shows the three plates (11, 21, 31) that form the axial thrust load sensor 10 with the axial thrust foil air bearing plate 11 on top, the intermediate washer plate 21 in the middle, and the axial thrust sensor plate 31 on the bottom of the axial thrust load sensor 10.

Figure 6:
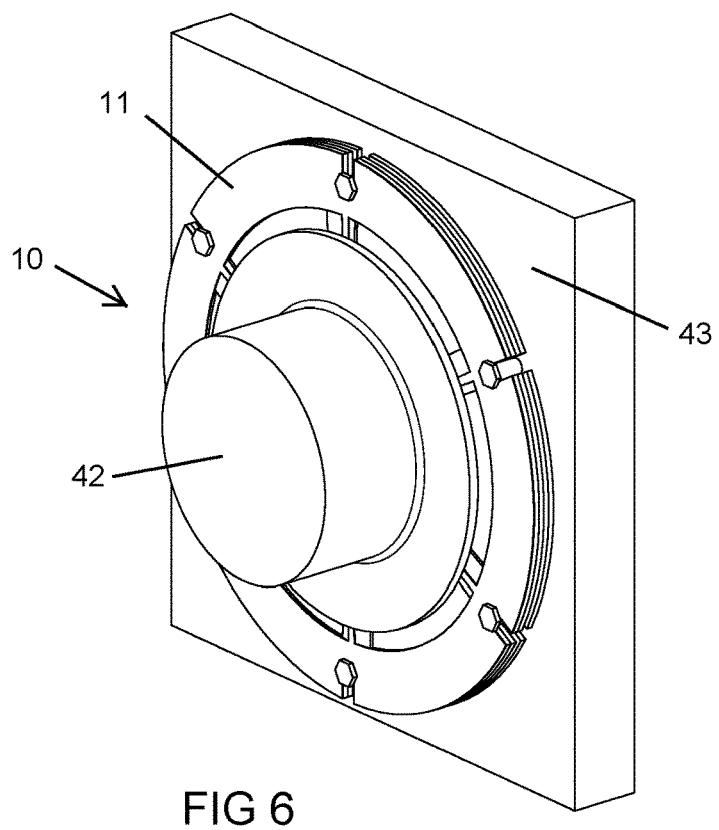
FIG. 6 shows the axial thrust foil air bearing with thrust sensor in an assembled view of the present invention.
Figure 7:
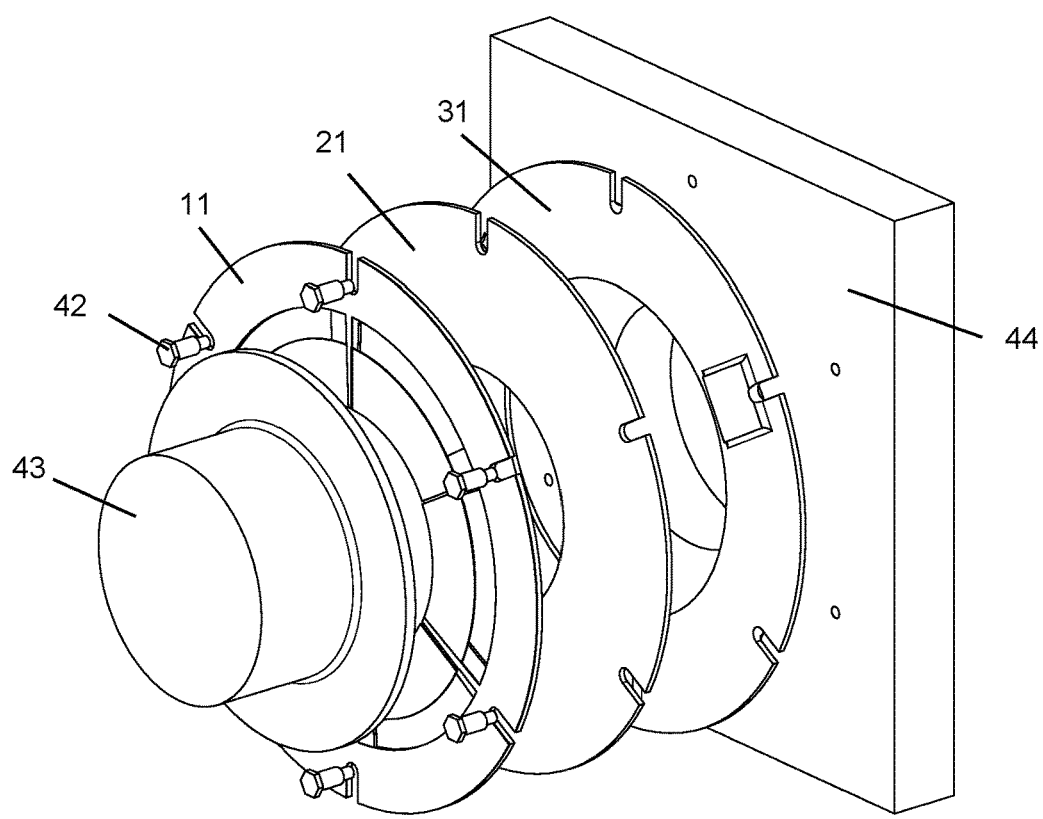
FIG. 7 shows the axial thrust foil air bearing with thrust sensor in an exploded view of the present invention.
Figure 8:
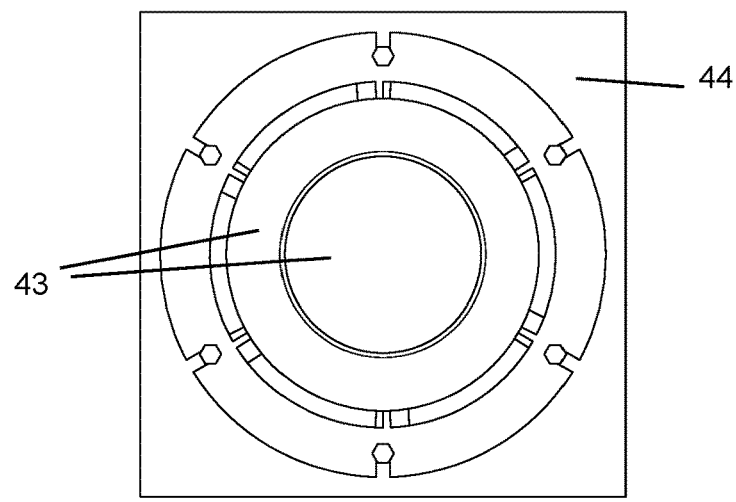
FIG. 8 shows a front view of the axial thrust foil air bearing with thrust sensor on a rotor.

FIG. 6 shows the axial thrust foil air bearing with thrust sensor in place on a rotor with a rotating part 43 and a static or stationary part 44. FIG. 7 shows the axial thrust foil air bearing with thrust sensor 10 in an exploded view on the rotor 43 and stator 44 of the engine. FIG. 8 shows a front view of the axial thrust foil air bearing with thrust sensor 10 on the rotor 43 and the stator 44 of the engine. FIG. 9 shows a side view of the axial thrust foil air bearing with thrust sensor 10 on the rotor 43 and the stator 44 of the engine. The front pedestals 33 abut a surface of the rotor 43 while the back pedestals 34 abut a surface of the stationary part 44. The shoulder bolts 42 hold the plates of the axial thrust foil air bearing with thrust sensor 10 in place while allowing for relative axial movement of the three plates with respect to each other. A shoulder bolt 42 includes a threaded end with a stopping surface that allows for the threaded bolt to screw into a threaded hole at a specific depth and stop. Thus, an axial space is formed between the head of the shoulder bolt 42 and the surface in which the threaded bolt is screwed into. This axial space is the space in which the three plates are secured with the allowable axial movement within this space.

The rotor of the gas turbine engine is supported by radial foil air bearings and axial thrust foil air bearings. The axial thrust foil air bearing includes the axial thrust foil air bearing with thrust sensor 10 with the strain gages 41 connected by wires to a controller that can regulate a cooling air flow pressure to an axial thrust foil bearing in order to regulate thrust balance. The axial thrust load sensor 10 will directly measure thrust bearing load and provide a signal for use in a thrust management system to provide for active thrust management control in flight. In practice, two of the axial thrust foil air bearing with thrust sensors 10 are used on a rotor with a first axial thrust foil air bearing with thrust sensor 10 located on one side to control axial thrust in a forward movement or the rotor and a second axial thrust foil air bearing with thrust sensor 10 on an opposite side to control axial thrust in an aft movement of the rotor. As the rotor is shifted in one axial direction, the load sensors will detect this increase in axial thrust and regulate the compressed air flow to increase the axial load to offset or counter this increased axial load. If the axial load on a rotor is only in one direction, then only one axial thrust foil air bearing with thrust sensor 10 is needed to control the axial load in this one axial direction.

The invention claimed is:

1. An axial thrust load sensor for a gas turbine engine comprising:
   an axial thrust foil bearing plate;
   an intermediate washer plate;
   a load sensor plate;
   the axial thrust foil bearing plate having a plurality of flexible fingers each with a bump foil to provide for a spring force; and,
   the load sensor plate includes a plurality of strain gauges on a front side and a back side at an equal spacing.

2. The axial thrust load sensor of claim 1, and further comprising:
   the strain gauges are connected to a controller that regulates a flow of cooling air to the axial thrust foil bearing in order to regulate a thrust balance.

3. The axial thrust load sensor of claim 1, and further comprising:
   the load sensor plate includes three pedestals on the front side and three pedestals on the back side.

4. The axial thrust load sensor of claim 1, and further comprising:
   the load sensor plate includes a strain gauge for each of the pedestals.

5. The axial thrust load sensor of claim 4, and further comprising:
   the strain gauges are located adjacent to the respective pedestal.

6. The axial thrust load sensor of claim 1, and further comprising:
   each of the three plates include a number of slots that open on the outer sides of the plates; and,
   a shoulder bolt for each of the slots to secure the three plates together but allow for axial movement of the three plates.

* * * * *